Jan. 19, 1965　　　F. W. KINSMAN　　　3,166,167
FLUID CLUTCH-BRAKE
Filed May 18, 1962　　　　　　　　　3 Sheets-Sheet 1

INVENTOR.
FRANK W. KINSMAN
BY Cullen & Canton
ATTORNEYS

Jan. 19, 1965    F. W. KINSMAN    3,166,167
FLUID CLUTCH–BRAKE
Filed May 18, 1962    3 Sheets-Sheet 2
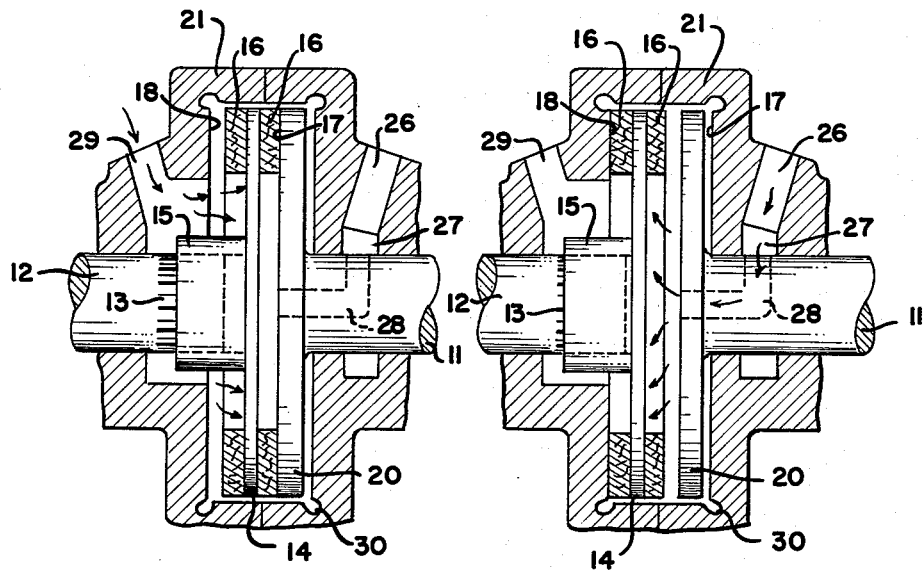
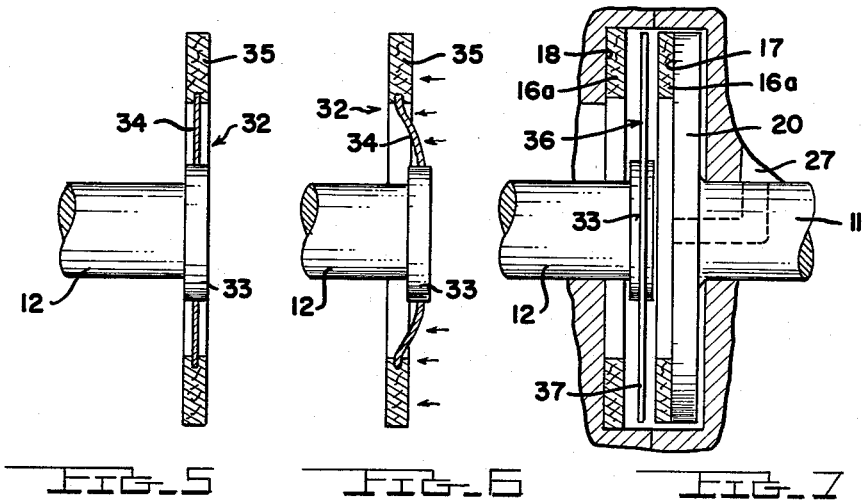
INVENTOR.
FRANK W. KINSMAN
BY Cullen & Cantor
ATTORNEYS Jan. 19, 1965  F. W. KINSMAN  3,166,167
FLUID CLUTCH-BRAKE
Filed May 18, 1962  3 Sheets-Sheet 3
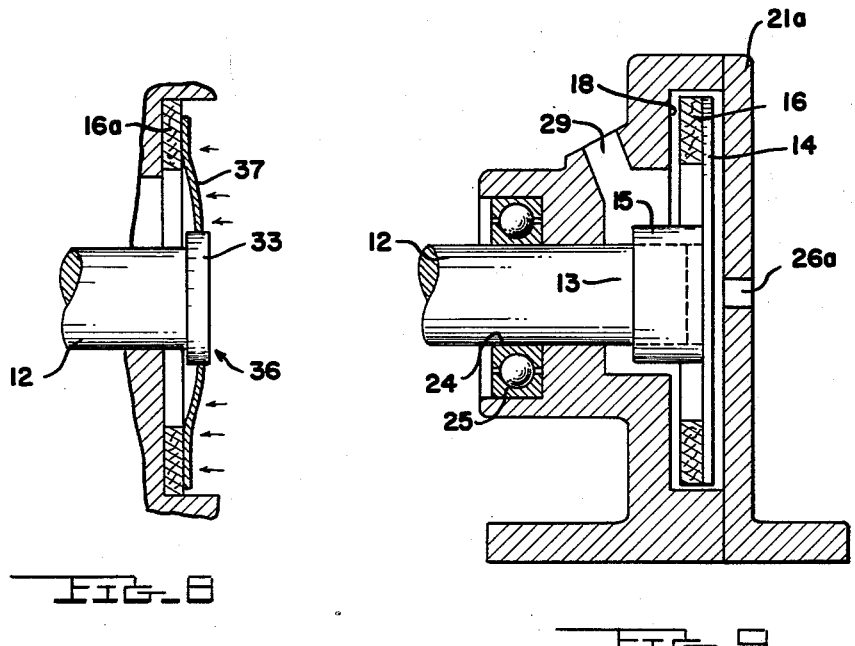
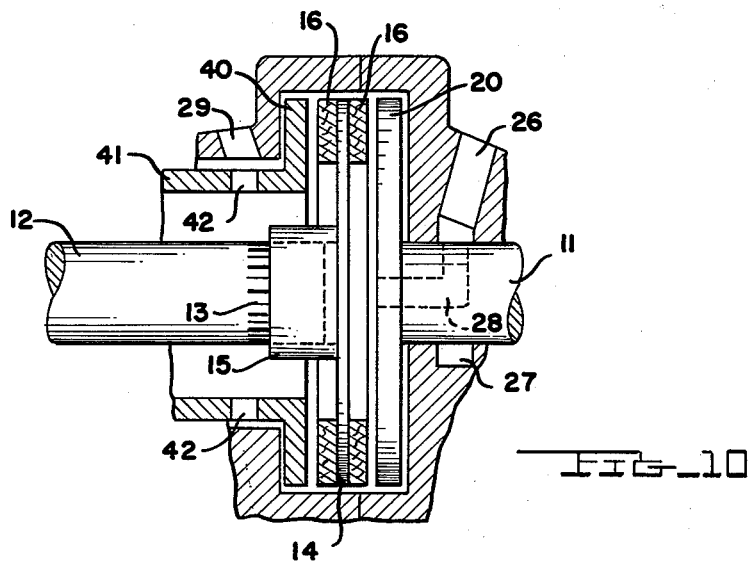
INVENTOR.
FRANK W. KINSMAN
BY Cullen & Canton
ATTORNEYS

United States Patent Office 3,166,167
Patented Jan. 19, 1965

3,166,167
FLUID CLUTCH-BRAKE
Frank W. Kinsman, 149 Pleasant Way, Penfield, N.Y.
Filed May 18, 1962, Ser. No. 195,908
3 Claims. (Cl. 192—18)

This invention relates to a fluid clutch-brake and more particularly to a device having a clutch-brake plate which is shiftable in response to fluid pressure into a clutching position or into a braking position for driving or braking a rotatable shaft.

For certain industrial purposes, it is desirable to rapidly connect a power source to a rotatable shaft used for driving a machine of some type and at times, to rapidly disengage power and stop rotation of the shaft. Hence, it is an object of this invention to form a clutch-brake having a plate which is rapidly shiftable, in response to fluid pressure, such as compressed air, into a clutching position wherein it frictionally clutches against a drive clutch plate, and into a braking position wherein it frictionally grips a brake surface, to thereby engage a rotatable shaft with a power source and to disengage the power and brake the shaft to a stop.

A further object of this invention is to form a clutch-brake having a plate which is mounted upon a shaft for axial movement relative to the shaft, and which is axially shiftable in response to fluid pressure to engage and disengage one of two contact surfaces, both of which may be power driven surfaces for two speed drive, or one of which may be a brake surface and the other a power driven surface.

These and other objects and advantages of this invention will become apparent upon reading the following description, of which the attached drawings form a part.

In these drawings:

FIGS. 3 and 4 are each fragmentary, cross-sectional, elevational views showing the device in a clutching or drive position and in a braking position, respectively.

FIG. 5 illustrates, in cross-section, a modified clutch-brake plate, and

FIG. 6 shows the plate of FIG. 5 axially shifted.

FIG. 7 illustrates, in cross-section, a third form of clutch-brake plate, and

FIG. 8 shows the plate of FIG. 7 shifted into braking position.

FIG. 9 illustrates, in cross-section, a modification, useful only for braking.

FIG. 10 illustrates a modification adapted for use as a two-speed drive clutch.

Clutch-brake (FIGS. 1–4)

Figure 1:
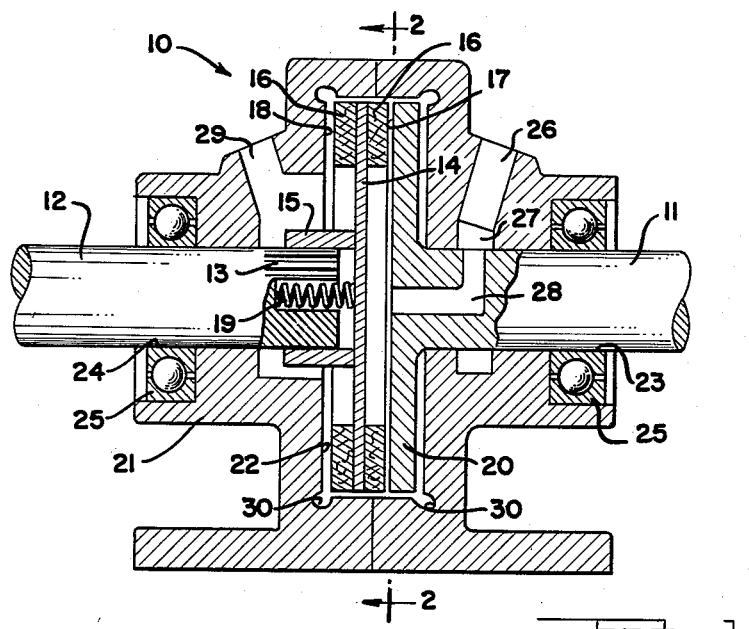
FIG. 1 is a cross-sectional elevational view of the clutch-brake.
Figure 2:
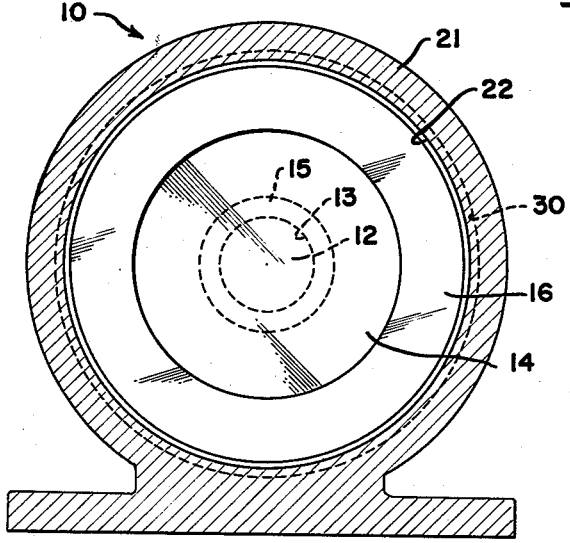
FIG. 2 is a cross-sectional view taken in the direction of arrows 2—2 of FIG. 1.

The clutch-brake 10, illustrated in FIGS. 1–4, is used to engage and disengage a power input shaft 11 with a driven shaft 12. The shaft 11 is connected to a power source, such as a motor (not shown), and the driven shaft 12 is connected to some power operated machine (not shown).

The end of the driven shaft 12 has an external spline 13 upon which is mounted a clutch-brake plate 14 having an internally splined collar 15 slidably fitted over the spline 13. Hence, the plate 14 is axially slidable relative to the shaft, but is fixed for rotation with the shaft.

A frictional ring 16 is secured upon the peripheral edge portions of each face of the plate 14. These rings are formed of a high frictional material, such as is commonly used in clutches and brakes.

Parallel to and closely adjacent to the opposite faces of the plate 14 are contact surfaces 17 and 18. The plate, which is axially shiftable into contact with one or the other of the two contact surfaces, is held in a neutral or central position by the pressure of a spring 19 mounted in an opening at the center of the shaft 12. Contact surface 17 is formed by the face of a clutch disk 20 joined to the end of power input shaft 11.

A stationary housing 21, having a central chamber 22 closely *surrounds* the disk 20, plate 14, and splined end 13 of the shaft 12, all these parts being located within the central chamber 22 of the housing. The radial space between the peripheral edge of plate 14 and the surrounding housing portion is sufficient to provide enough clearance to prevent contact therebetween, but is small enough to provide for the required actuating pressure drop around plate 14 when the plate is shifted axially by fluid pressure. Contact surface 18 is formed by one wall of the housing chamber, thus forming a fixed, brake surface. Shaft 11 extends out of the housing through housing opening 23 and shaft 12 extends oppositely out of the housing through opening 24. Each of the shafts are supported by suitable bearings 25.

Pressurized fluid, such as compressed air, is supplied to the chamber, at the disk side of the plate 14, through a pressurized fluid supply passage 26, which opens into a groove 27 surrounding shaft 11 and in turn opens into a passageway 28 extending through the shaft 11 and disk. An opening 29 carries fluid to the chamber at the brake side of the plate 14.

Preferably, continuous grooves 30 are formed at the opposite sides of the chamber 22 adjacent the periphery of the plate, these grooves serving to catch and hold loose particles which may wear off the rings 16.

Operation

In operation, the plate 14 is held in one of three positions, namely, a neutral position (see FIG. 1), a clutch or drive position (see FIG. 3) and a brake position (see FIG. 4).

When the driven shaft is idle, the plate 14 is in the neutral position shown in FIG. 1. To couple the driven shaft 12 to the drive shaft 11, compressed air or other fluid is fed through opening 29 into the chamber, where it pressure shifts the plate axially towards the disk until ring 16 frictionally grips and seals against the disk contact surface 17. Thus, the two shafts are coupled together for rotation at the same speed (see FIG. 3). The plate 14 is held in clutching position by the pressure for as long as desired. To stop rotation of shaft 12, the compressed air is fed into passage 26 instead of opening 29. The compressed air passes through grooves 27 and passageway 28 into the chamber of the disk side of plate 14 and pushes the plate into contact with the brake surface 18 (see FIG. 4), thereby stopping rotation of shaft 12. When the rings 16 grip the contact surfaces 17 or 18, they act as seals to prevent leakage of fluid between the contacting surfaces.

Flexible plate (FIGS. 5–6)

FIGS. 5 and 6 illustrate a modified form of clutch-brake plate 32 comprising a central hub 33, which is rigidly fixed to the end of shaft 12 and a flat annulus 34, made of relatively flexible sheet metal or the like, on whose outer peripheral edge is fixed a ring of frictional material 35. As shown in FIG. 6, this plate instead of bodily sliding axially on the shaft 12, merely flexes axially at its annulus, relative to the shaft 12, in response to the fluid pressure, to the point where the ring 35 contacts the respective contact surfaces.

Second flexible plate (FIGS. 7-8)

FIGS. 7 and 8 illustrate a clutch-brake plate 36 similar to that of FIGS. 5 and 6, but wherein the relatively flexible annulus 37 is free of the frictional rings. Instead frictional rings 16a are secured directly to the contact surfaces 17 and 18. Thus, the plate annulus flexes, in response to fluid pressure, to contact the frictional rings 16a on either of the contact surfaces (see FIG. 8).

Brake construction

FIG. 9 illustrates a modification, similar to FIG. 1, but which operates only as a brake. Here, the housing 21a, receives only the end of the shaft 12, and the plate 14, and is formed with the brake surface 18. Fluid is fed into the housing through an opening 26a to shift the plate 14 into braking position against brake surface 18. The opening 29 in the housing is used as an exhaust for such fluid as leaks around the plate.

Two speed clutch (FIG. 10)

FIG. 10 illustrates a modification, similar to FIG. 1, but wherein a second clutch disk 40 is provided in place of the brake contact surface 18. The disk 40 is secured to the end of a hollow, drive shaft 41 having openings 42 through which pressurized fluid may flow from housing opening 29 to the adjacent face of the plate.

In this construction, the plate 14 may be shifted by fluid pressure into contact with either disk 20 or disk 40. Shafts 11 and 41 would normally operate at different speeds or in different directions so that selective coupling of driven shaft 12 to either of the two drive shafts provides a two speed or reversing clutch arrangement.

This invention may be further developed within the scope of the following attached claims. Accordingly, it is desired that the foregoing description be read as being merely illustrative on an operative embodiment of this invention and not in a strictly limiting sense.

I now claim:

1. A clutch-brake comprising a pair of axially aligned shafts closely arranged end to end, a circular plate axially movably, but non-rotatably mounted upon the end of one of the shafts and a disk rigidly mounted upon the end of the other shaft parallel to the plate, with the plate and disk being coaxial with the shafts; a fixed housing having an integral, circular-in-cross-section, sealed chamber, coaxial with and receiving the ends of the shafts and disk and plate, with the shafts being rotatably supported in said housing and with the circular wall of the chamber being closely adjacent to the peripheral edge of said plate; said chamber having one end arranged parallel to and closely adjacent to the plate and forming a fixed contact surface, the plate being between and normally being spaced a short distance from the disk and said fixed contact surface; a pair of passageways, for carrying high pressure fluid, formed in said housing and each opening into the chamber at an opposite face of the plate for selectively carrying high pressure fluid into the chamber at one or the other faces of the plate; wherein the plate is axially movable by the fluid into face to face contact with either the fixed contact surface for braking rotation of the shaft upon which it is mounted or with the disk for clutching the shafts together.

2. A construction as defined in claim 1, and including a continuous ring formed of high frictional material secured to each of the opposite faces of said plate at the peripheral edges thereof for respectively contacting and sealing against either the disk or fixed contact surface when the plate is axially moved towards the disk or fixed contact surface.

3. A construction as defined in claim 1 and said chamber having an opposite end spaced a short distance from the opposite, that is, adjacent end of the disk, and the peripheral edge of said disk being spaced from the circular wall of said chamber, wherein pressurized fluid may fill the space between the disk and said chamber opposite end when the plate and disk are in contact.

References Cited by the Examiner
UNITED STATES PATENTS

| | | |
|---|---|---|
| Re. 24,905 | 12/60 | Giffen. |
| 847,575 | 3/07 | Hanson _____ 192—86 X |
| 2,082,277 | 6/37 | Dierfeld. |
| 2,840,205 | 6/58 | Linke. |
| 2,909,255 | 10/59 | Chung. |
| 2,966,245 | 12/60 | Judge. |

FOREIGN PATENTS

| | | |
|---|---|---|
| 1,222,083 | 6/60 | France. |

DAVID J. WILLIAMOWSKY, *Primary Examiner.*
THOMAS J. HICKEY, *Examiner.*